May 26, 1925.
E. G. STAUDE
1,539,064
PHONOGRAPH
Original Filed Sept. 27, 1920    3 Sheets-Sheet 1
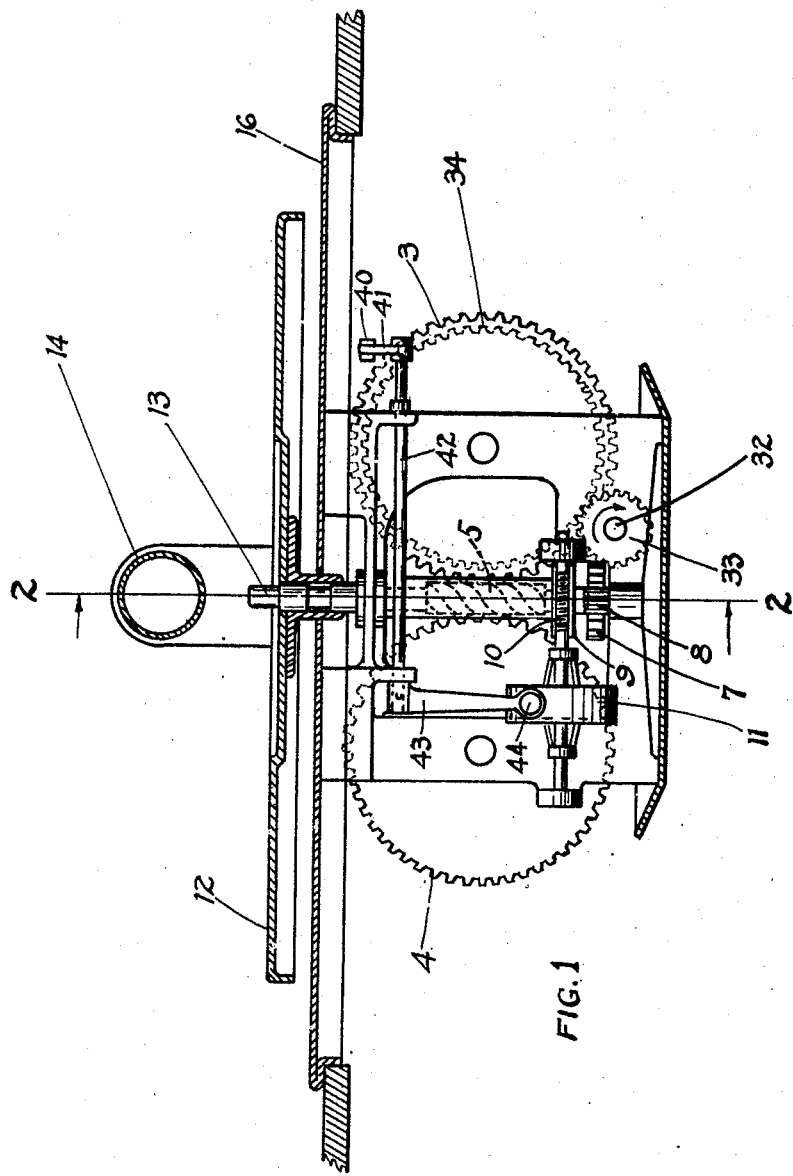
INVENTOR
EDWIN G. STAUDE
BY
ATTORNEYS

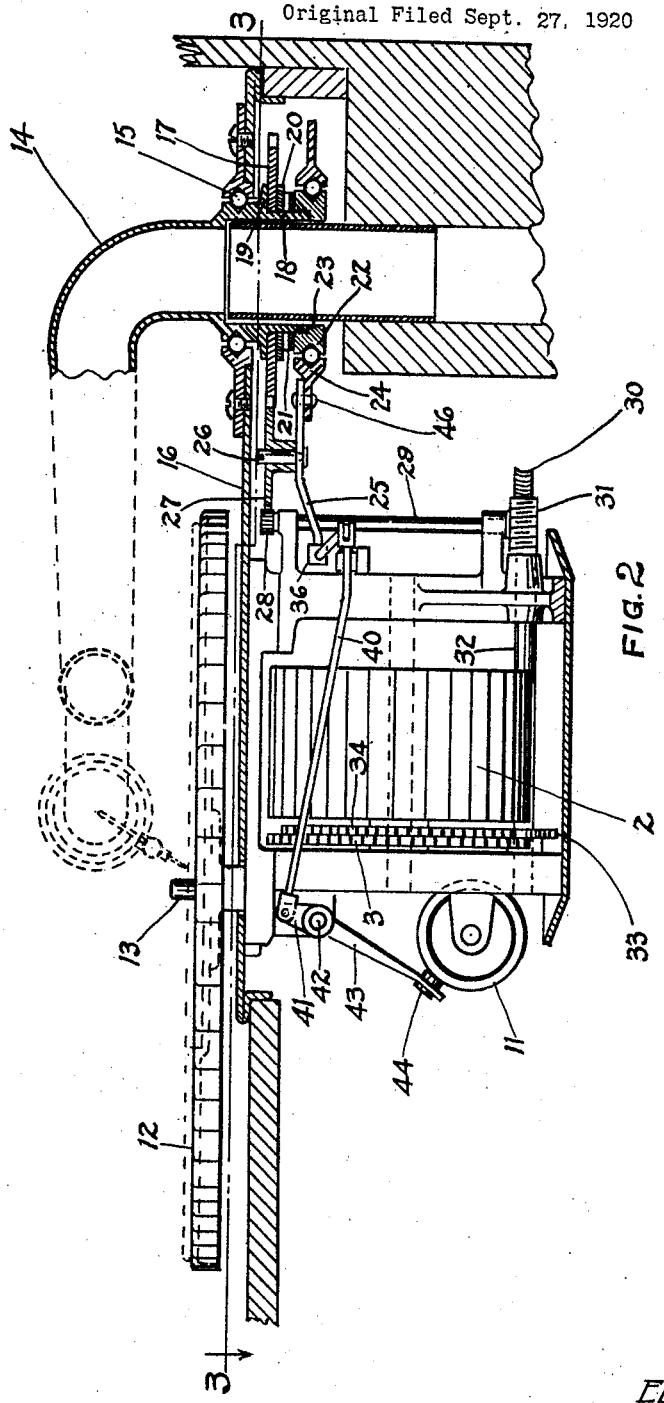

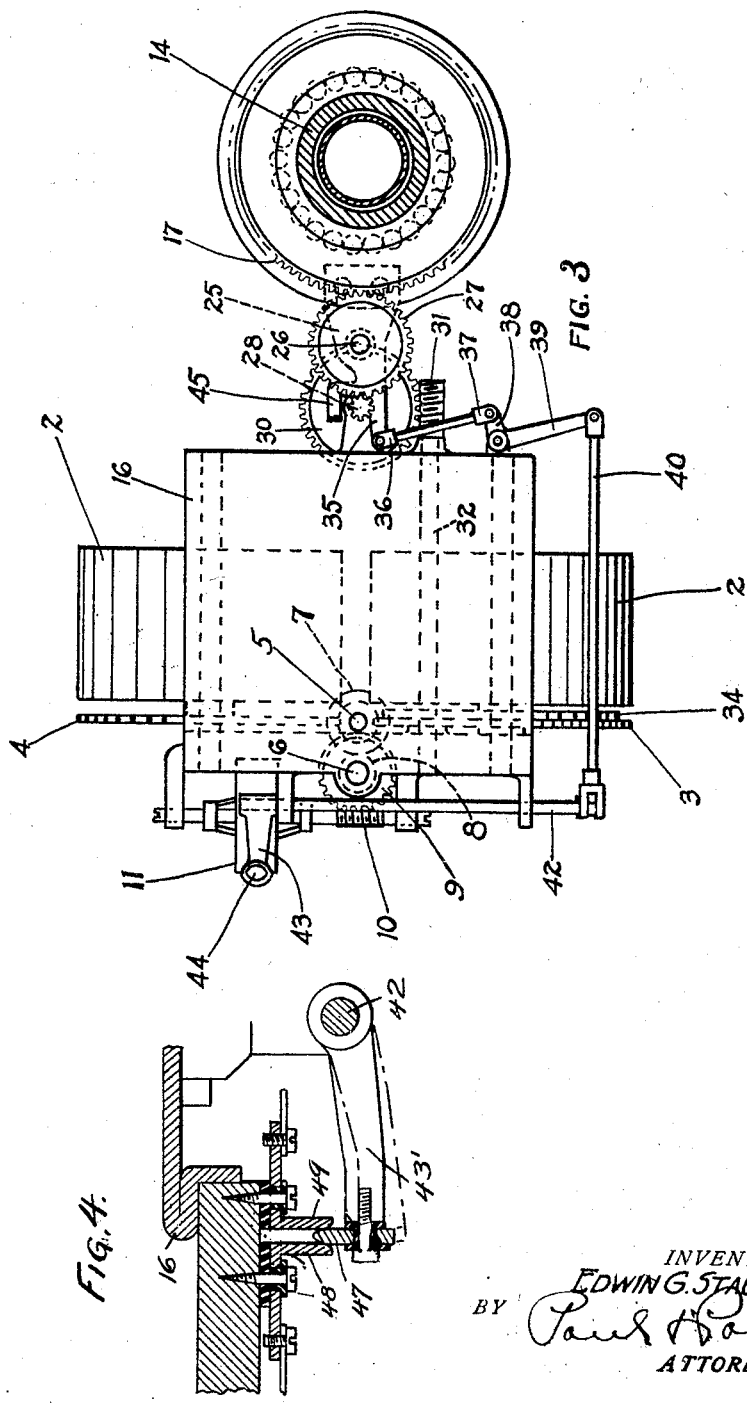

Patented May 26, 1925.

1,539,064

UNITED STATES PATENT OFFICE.

EDWIN G. STAUDE, OF MINNEAPOLIS, MINNESOTA.

PHONOGRAPH.

Application filed September 27, 1920, Serial No. 412,919. Renewed September 29, 1924.

*To all whom it may concern:*

Be it known that I, EDWIN G. STAUDE, a citizen of the United States, resident of Minneapolis, county of Hennepin, State of Minnesota, have invented certain new and useful Improvements in Phonographs, of which the following is a specification.

The object of my invention is to provide an improved means for automatically stopping the turn table when the reproducer has reached the end of the record and regardless of the length of the record.

A further object is to provide means for stopping the turn table at any point in the record.

A further object is to provide positively acting means for allowing the playing of the record to be finished before the stopping device becomes effective.

A further object is to provide means of the class described which will be positive in operation, inexpensive in construction, easily applied to a phonograph and strong and durable and not likely to get out of order.

A further object is to provide a turn table stopping means which may be used in connection with a mechanical or electrically operated motor.

The invention consists generally in various constructions and combinations, all as hereinafter described and particularly pointed out in the claims.

In the accompanying drawings forming part of this specification,

Figure 1 is a vertical sectional view through a portion of a phonograph, illustrating the turn table operating mechanism, Figure 2 is a vertical sectional view on the line 2—2 of Figure 1, Figure 3 is a sectional view on the line 3—3 of Figure 2, looking in the direction of the arrow, Figure 4 is an enlarged detail view of an electrical switch device, showing the manner in which the invention can be readily adapted for use with an electrically driven motor.

In the drawings, 2 represents an ordinary double spring motor, having worm drive wheels 3 and 4 meshing with a worm 5 which drives the spindle 6, the spur gear 7 and the pinion 8. Mounted on the spindle 6 is a worm gear 9 which meshes with a worm shaft 10 for driving the ordinary form of phonograph governor 11. The turn table 12 is mounted on the tapered extension 13 of the spindle 6 and as the wheels 3 and 4 revolve, power will be transmitted to the worm 5, the gears 7 and 8 and the spindle 6 to revolve the turn table. All this is ordinary construction in phonographs.

For controlling the speed the governor 11 is provided with the usual centrifugal arrangement which I do not show in detail, as it form no part of my present invention.

Various devices have been provided for stopping the revolution of the turn table when the reproducer reaches the end of the record. These devices are more or less complicated and usually require adjustment at the beginning of each record to insure the stopping of the turn table at the end of the record. This adjustment is difficult to make and oftentimes the turn table will stop before the record is finished, or the adjustment may be inaccurately made and the record will keep on revolving after the reproducing needle has reached the annular groove at the end of the record. This necessity for adjustment is usually due to the variation in length of the records.

With my invention it is impossible for the turn table to stop, unless by some act of the user, until the reproducer needle has reached the annular groove or until the record is finished.

14 represents the tone arm, mounted in a ball race 15 secured to the plate 16 on which the motor is mounted. I prefer to mount the tone arm in this way for the purpose of eliminating friction. A spur gear 17 is mounted on a sleeve 18 which forms a depending portion of the tone arm and this gear is held by friction between a flange 19 of the tone arm and a washer 20. For the purpose of adjusting the friction contact of the gear 17, I prefer to provide a spring washer 21 having small corrugations and held in place by the annular ball race 22 having a threaded portion which engages the sleeve 18 and contacts with a shoulder 23. The ball race 22 supports the part 24 to which the arm 25 is secured that supports a stud 26 carrying a gear 27 that meshes with a gear 17. The pinion 28 is secured to a shaft 29 having a worm wheel 30 on its lower end which meshes with the worm 31 on the shaft 32. A spur gear 33 is mounted on the shaft 32 and meshes with a similar gear 34 that is fastened to the inner face of the worm gear 3. The arm 25 is provided with an extension 35 on the end of which is mounted a fork 36 connected to a similar fork 37 carried by a bell crank 38 and having a long arm 39 connected by a rod 40 to an arm 41. A shaft 42 supports the arm 41 and is provided with a depending arm 43 which overhangs the governor 11 and is provided with a yielding pad 44 for contact with the surface of the governor when it is desired to stop the revolution of the turn table. The arm 25 is provided with an extension 45 on the opposite side of the shaft 29 for the purpose of limiting the movement of the arm 25.

The operation of my invention is as follows: As the gears 3 and 4 revolve, the gear 34 secured to the gear 3 will move in the same direction, rotate the pinion 33 and through the worm 31 will rotate the worm wheel 30 and revolve the shaft 29 and the gear 28. The gear 28 meshes with the gear 27 and consequently the gear 27 will revolve contra-clockwise.

The tone arm supporting the reproducing needle will follow in the groove of the record towards the center of the record, approximately at the rate of one inch for ninety six revolutions of the record, and as the gear 17 is frictionally mounted on the tone arm, it will revolve clockwise or with the tone arm.

Since the gear 17 meshes with the gear 27 the surface or pitched speeds of both gears 17 to 27 must be the same.

The speed of the gear 28 driven by the motor is such that, its surface or pitched speed is identical with that of the surfaces or pitched speed of the gear 17, and since the gear 28 revolves counterclockwise, it naturally follows that during the period of time when the tone arm is traveling towards the center of the record the gear 27 will revolve on the stud 26 without changing the position of the stud 26.

As soon, however, as the needle reaches the end of the record and the needle begins to move in the annular groove at the end of the record, the gear 17 will cease revolving since the tone arm has no further movement towards the center of the turn table.

The gear 28 will, however, continue to revolve and since the gear 17 is now stationary, it follows that the gear 27 must now roll over the pitched surface of the gear 17 and thereby cause the stud 26 to move counterclockwise around the pivotal center of the tone arm.

The movement is, of course, slight but sufficient to cause the arm 25 in which the stud 26 is secured to have a sufficient movement, so that the part 35, which is a continuation of the arm 25, through the mechanism of the connecting rods 36 and 37, the arms 38 and 39, the rod 40, through the arm 41, will rock the shaft 42 and move the brake arm 43, which will be brought in contact with the governor surface and stop the motor. The tone arm may then be lifted up in the usual manner and swung outwardly, and since the gear 17 is in mesh with the gear 27, it cannot revolve but must slip in its bearings between the parts 19 and 20. During this movement of the tone arm the motor is still at rest and can not resume operation until the brake arm 43 is raised from the governor surface 11. It will be noted, however, that a movement of the tone arm toward the left will immediately release the governor by lifting the brake arm 43. I am therefore able in practice to obtain any control of the motor by the simple manipulation of the tone arm.

When the motor stops, the operator will move the tone arm toward the right, away from the record, when the record can be removed from the turn table and a new one placed thereon. As soon as the tone arm is moved toward the left slightly, it will release the brake arm 43, allowing the motor to start, the difference between the movement of the tone arm and the movement of the mechanism being compensated for by the frictional mounting of the gear 17. The operator will place the needle in the groove at the periphery of the record and the record will continue to revolve until the needle reaches the end of the spiral groove or when the tone arm reaches the annular groove near the center of the record. At this point the mechanism will stop the motor and the operator may then replay the record or place a new one on the turn table.

No other form of stop will be necessary and the operator can stop the machine at any point by simply lifting the tone arm and the needle out of contact with the face of the record and moving the arm toward the right when the brake will be applied and the motor stopped.

By attaching a switch device to the bell crankarm 39, this mechanism can be readily adapted for use with an electrically driven motor where, instead of applying a brake, the current is closed or opened, as may be desired. For instance, Figure 4 shows a detail of an electrical switch device in which 43' represents an arm secured to the rock shaft 42 and on the end of the arm 43' is an insulated contact piece 47 adapted to pass between the small insulated angles 48 and 49 and thereby close the circuit so the current may flow to operate the motor. As soon as the arm 43' is rocked downward and away from the angles 48 and 49, the part 47 being then out of contact with the angles 48 and 49, it follows that the circuit is then open and the current can not flow to operate the motor.

The arm 25 is shown mounted concentric with the sleeve 18. The movement of the arm is so slight, however, that its pivot point, instead of being concentric with the tone arm, may be moved in as far as the point indicated by the rivet 46, if desired. This construction would simplify the mechanism and make it fully as efficient as the movement is so slight the difference in travel of the gears on the pitch circle would be insufficient to cause any cramping or binding.

In various ways the details of construction herein shown and described may be modified and still be within the scope of my invention.

I claim as my invention:

1. The combination with a phonograph turn-table, operating motor, and tone-arm, of a plurality of gears meshing one with the other, one of said gears having a frictional connection with a part of the tone-arm, means for driving the other gear from the motor, a brake in operative relation to a part of the motor, and means operatively connecting the brake with the gears for releasing the brake when the gears move at substantially the same speed and setting the brake upon a difference in speed of the gears.

2. The combination with a phonograph turn-table, a motor, and a tone-arm, of a brake, a gear having a frictional connection with a part of the tone-arm, a gear driven from the motor and meshing with the tone-arm gear, said gears operating at one speed during the inward travel of the tone-arm and at a different speed in setting the brake, and brake actuating means operatively associated with said gears to control the release and the setting of the brake in change of gear speed.

3. The combination, with a phonograph turn table, operating motor and tone arm, of a friction brake device and an actuating means therefor, a gear frictionally mounted on said tone arm concentric with the axis thereof, a gear connecting said tone arm gear with said brake operating means, said gears operating at the same speed during the inward travel of the tone arm on the record and at a different speed when said inward movement ceases.

In witness whereof, I have hereunto set my hand this 24th day of September 1920.

EDWIN G. STAUDE.